US007514869B2

(12) United States Patent
Woo

(10) Patent No.: US 7,514,869 B2
(45) Date of Patent: Apr. 7, 2009

(54) PLASMA DISPLAY PANEL AND PLASMA DISPLAY DEVICE

(75) Inventor: Seok-Gyun Woo, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 130 days.

(21) Appl. No.: 11/180,057

(22) Filed: Jul. 12, 2005

(65) Prior Publication Data

US 2006/0066238 A1 Mar. 30, 2006

(30) Foreign Application Priority Data

Sep. 24, 2004 (KR) ...................... 10-2004-0077063

(51) Int. Cl.
*G06F 1/16* (2006.01)

(52) U.S. Cl. .......................... 313/582; 361/681; 445/70

(58) Field of Classification Search ......... 313/581–587, 313/493; 445/70–73; 361/681
See application file for complete search history.

(56) References Cited

U.S. PATENT DOCUMENTS 3,778,126 A * 12/1973 Wilson ........................ 445/25
3,778,127 A * 12/1973 Langston et al. .............. 445/25
3,966,449 A * 6/1976 Foster et al. .................... 65/43
5,207,607 A * 5/1993 Nagano et al. ................ 445/25
6,081,306 A * 6/2000 Nagano ....................... 349/32
6,288,489 B1 * 9/2001 Isohata et al. ............... 313/582
6,313,579 B1 * 11/2001 Nakano et al. .............. 313/493
6,531,818 B1 * 3/2003 Normanni ................... 313/582
6,623,593 B2 * 9/2003 Igeta .......................... 156/293
6,750,605 B2 * 6/2004 Moore ........................ 313/495
6,809,476 B2 * 10/2004 Lee et al. ..................... 313/581
6,840,833 B1 * 1/2005 Motowaki et al. ............. 445/25
6,848,964 B1 * 2/2005 Sasaki et al. .................. 445/25
6,899,139 B2 * 5/2005 Normanni .................. 138/109
2003/0137245 A1 * 7/2003 Nakatani et al. ............ 313/582
2003/0218423 A1 * 11/2003 Lin et al. .................... 313/582
2004/0119410 A1 * 6/2004 Jun et al. .................... 313/582
2005/0035715 A1 * 2/2005 Kado et al. ................. 313/582
2005/0067956 A1 * 3/2005 Kim ........................... 313/581
2005/0073253 A1 * 4/2005 Lin ............................ 313/582
2005/0099124 A1 * 5/2005 Chen et al. .................. 313/582
2006/0125364 A1 * 6/2006 Takeda et al. ................. 313/46
2006/0132037 A1 * 6/2006 Okawa et al. ............... 313/582

FOREIGN PATENT DOCUMENTS

JP 08-162028 6/1996

(Continued)

*Primary Examiner*—Peter Macchiarolo
(74) *Attorney, Agent, or Firm*—Christie, Parker & Hale, LLP

(57) ABSTRACT

A plasma display panel that includes a first plate and a second plate that are sealed to each other to form discharge cells. The discharge cells generate images by gas discharge. The plates include an exhaust port that is formed along an edge of the first plate to define a path to connect to the discharge cells, an exhaust tube on the outside of the first plate that is connected to the discharge cells through the exhaust port, and a pad that is formed around the exhaust port and the exhaust tube of the first plate. This structure effectively blocks a noise path around the exhaust port and the exhaust tube formed in the rear plate.

9 Claims, 5 Drawing Sheets

FOREIGN PATENT DOCUMENTS

| | | | |
|---|---|---|---|
| JP | 11-272207 | | 10/1999 |
| JP | 2001-068032 | | 3/2001 |
| JP | 2001-348542 | | 12/2001 |
| JP | 2004-004705 | | 1/2004 |
| KR | 2000-0001763 | * | 1/2000 |

* cited by examiner

PLASMA DISPLAY PANEL AND PLASMA DISPLAY DEVICE

CROSS-REFERENCE TO RELATED APPLICATION

This application claims priority to and the benefit of Korean Patent Application No. 10-2004-0077063 filed in the Korean Intellectual Property Office on Sep. 24, 2004, the entire content of which is incorporated herein by reference.

BACKGROUND OF THE INVENTION (a) Field of the Invention

The embodiments of the present invention relate to a plasma display panel in a plasma display device, and more particularly, to a plasma display panel in a plasma display device that is capable of effectively blocking a path of noise around an exhaust port and an exhaust tube.

(b) Discussion of the Related Art

Generally, a plasma display panel (PDP) is formed from a front plate and a rear plate that are sealed to one another to hold a discharge gas inside. The front plate includes a front substrate, display electrodes formed on a rear surface of the front substrate, a dielectric layer covering the display electrodes, and a protective layer formed on the dielectric layer. The rear plate includes a rear substrate, address electrodes formed on a front surface of the rear substrate so as to intersect the display electrodes, a dielectric layer covering the address electrodes, barrier ribs formed on the dielectric layer to divide discharge cells and a phosphor layer formed in the discharge cells.

The PDP is driven by sequentially generating an address discharge, a sustain discharge and a reset discharge. Specifically, when a sustain pulse is applied to display electrodes, an electrical field is formed between the display electrodes and the address electrodes in the discharge cells. The discharge gas is excited to a high-energy plasma state by the electrical field and is then stabilized to a low energy level to generate ultraviolet rays. The ultraviolet rays excite the phosphor layer to a higher energy level. The phosphor layer is then stabilized to a low energy level to radiate visible rays. As a result, a desired image can be generated.

The above-mentioned PDP has an exhaust port and an exhaust tube located on one side of the rear substrate. The exhaust port and the exhaust tube are indispensable to the process of evacuating air from the sealed area inside of the front plate and the rear plate and to the process of completing the seal of the plates after injecting discharge gas into the interior space. The exhaust port and the exhaust tube secure a passage in the PDP through a dummy region, that is, a terminal connecting region formed between a display region that displays images and an interconnection region that connects electrode terminals to a connector.

When a PDP having the above-mentioned structure is driven, a natural frequency of the plasma display panel resonates with the frequency of a driving signal that is applied to the display electrodes from a driving circuit. This resonance results in the generation of noise. The noise is amplified by the exhaust port and the exhaust tube that are formed on one side of the rear substrate.

SUMMARY OF THE INVENTION

Embodiments of the invention provide a plasma display panel and a plasma display device capable of effectively blocking the path of noise around an exhaust port and an exhaust tube that are formed on one side of a rear plate.

In one embodiment of the invention, a plasma display panel includes a first and a second plate that are sealed to each other to form discharge cells between the plates. The discharge cells can generate images through gas discharge. The plasma display panel also includes an exhaust port that is formed in the vicinity of an edge of the first plate. The exhaust port is a part of a path connected to the discharge cells. An exhaust tube is formed on the outside of the first plate and is connected to the discharge cells through the exhaust port provided in the first plate. A pad is disposed on the first plate around the exhaust port and the exhaust tube.

In another embodiment of the invention, a plasma display panel may include a chassis base that is attached to the first plate having the pad by a double-sided tape. In this embodiment, the pad contacts opposing surfaces of the first plate and the chassis base. The pad may contact the outer circumference of the exhaust tube or be interposed between the opposing surfaces of the first plate and the chassis base to directly absorb noise and vibration generated around the exhaust port and the exhaust tube. The pad may be formed separately from the double-sided tape that attaches the first plate to the chassis base or formed as an extension of the double-sided tape. The pad may be made of silicon or composed of an adhesive tape or foam adhesive tape to effectively absorb the noise and vibration.

DESCRIPTION OF THE EMBODIMENTS

Figure 1:
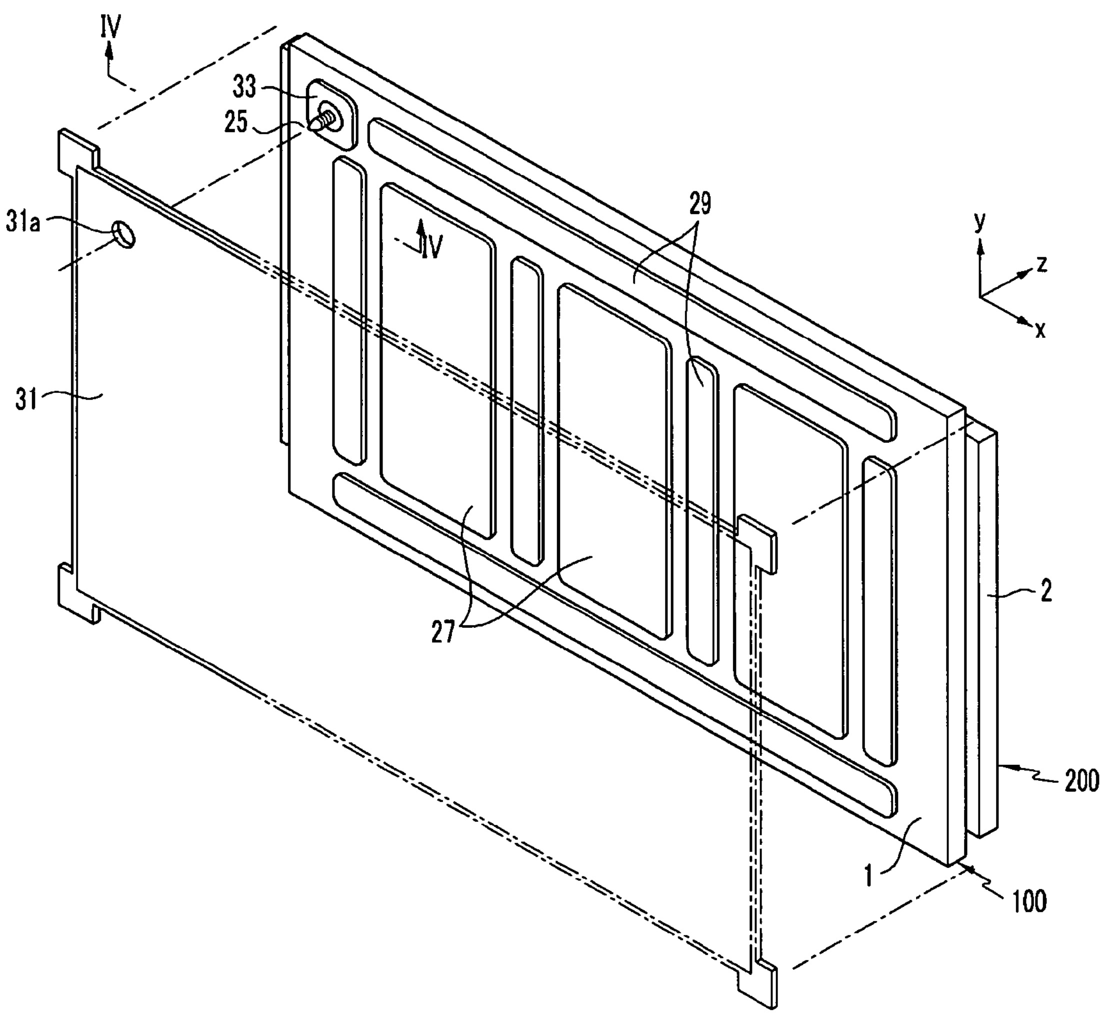
FIG. 1 is an exploded perspective view of a plasma display device with a plasma display panel and a chassis.
Figure 2:
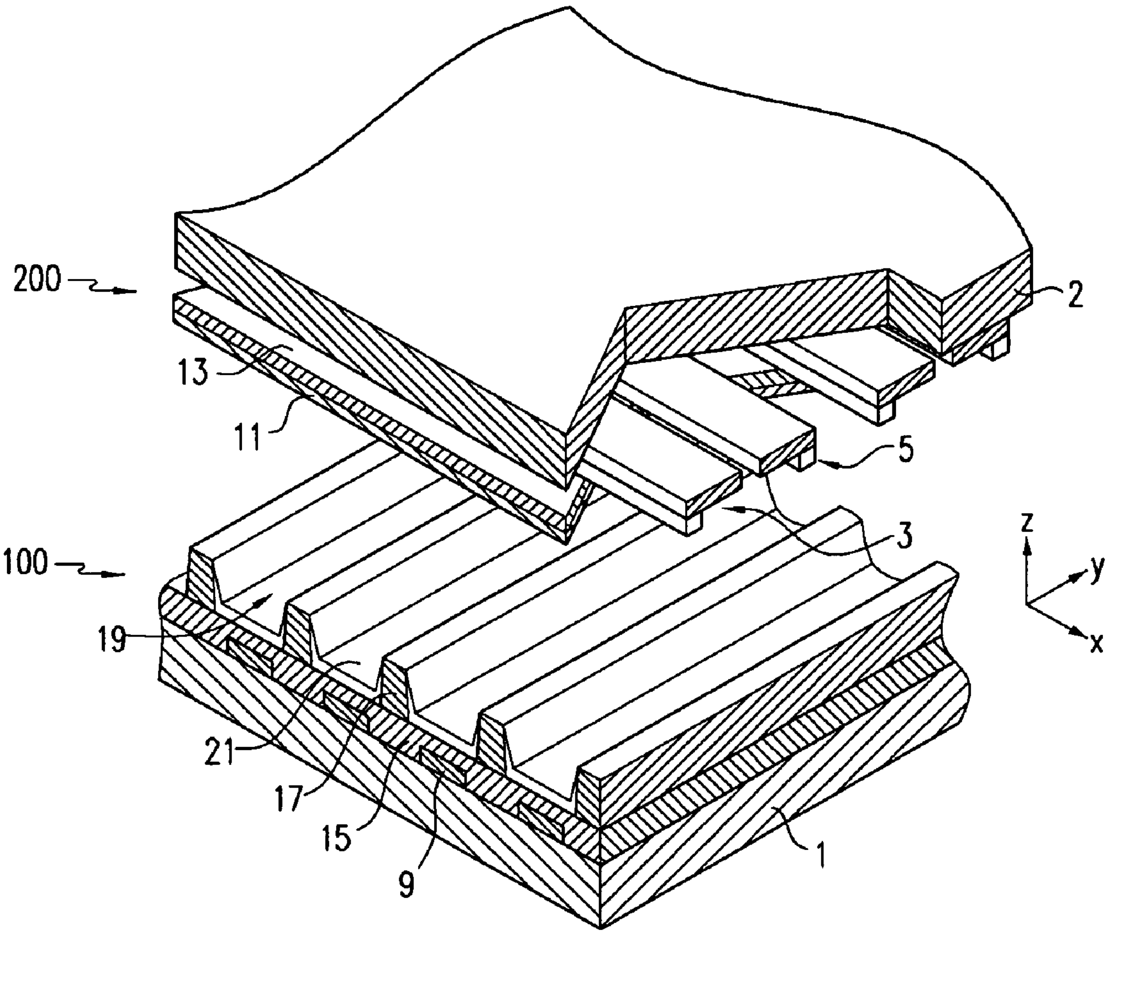
FIG. 2 is a partially exploded perspective view of the plasma display panel.

FIG. 1 is an exploded perspective view of a plasma display device with a plasma display panel and a chassis base according to an embodiment of the present invention, and FIG. 2 is a partially exploded perspective view of the plasma display panel according to the embodiment of the invention.

Referring to FIGS. 1 and 2, the plasma display panel ("PDP") according to an embodiment of the invention includes discharge cells 19 that generate images by using gas discharge therein. The discharge cells 19 are formed by sealing a first plate 100 (hereinafter, referred to as a 'rear plate') to a second plate 200 (hereinafter, referred to as a 'front plate'). The height of the discharge cells 19 is considerably smaller than those of the rear plate 100 and the front plate 200. Therefore, in FIG. 1, it appears as though a rear substrate 1 and a front substrate 2 are directly sealed to each other.

The PDP includes a set of sustain electrodes 3 and scan electrodes 5 that serve as display electrodes. The display electrodes are formed on an inner surface of the front substrate 2 that forms the front plate 200. Address electrodes 9 are formed on an inner surface of the rear substrate 1 that forms the rear plate 100. The sustain electrodes 3 and the scan electrodes 5 are covered with a laminate structure including a dielectric layer 11 and a protective layer 13. The address electrodes 9 formed on the inner surface of the rear substrate 1 are covered with a dielectric layer 15. Barrier ribs 17 are formed on the dielectric layer 15 to define the discharge cells 19 and a phosphor layer 21 is formed in the discharge cells 19. Mixed inert gas, such as Ne or Xe, is charged in the discharge cells 19. The display electrodes and the address electrodes 9 intersect each other with the discharge cells 19 interposed therebetween to allow for the selection of a discharge cell 19. The barrier ribs 17 extend in one direction (Y-axis direction) in strips. Alternatively, the barrier ribs 17 may be formed in a matrix with ribs extending in two intersecting directions, such as X-axis and Y-axis directions.

Heat radiating sheets 27 and double-sided adhesive tapes 29 are provided on the rear substrate 1 of the PDP. The PDP is attached to the chassis base 31 to form the plasma display device. In this plasma display device, the heat radiating sheets 27 transmit the heat generated when the PDP is driven to the chassis base 31. The rear substrate 1 of the PDP is attached to the chassis base 31 by the double-sided adhesive 29 so that the heat radiating sheets 27 are positioned between the rear substrate 1 and the chassis base 31.

When the PDP is driven, address discharges are initiated by an address pulse applied to the address electrodes 9. A scan pulse is applied to the scan electrodes 5 during an address period to select a discharge cell 19 to be turned on. During a sustain period, a sustain discharge is initiated by positive and negative sustain pulses which are alternately applied to the scan electrodes 5 and the sustain electrodes 3, which result in the generation of images.

Figure 3:
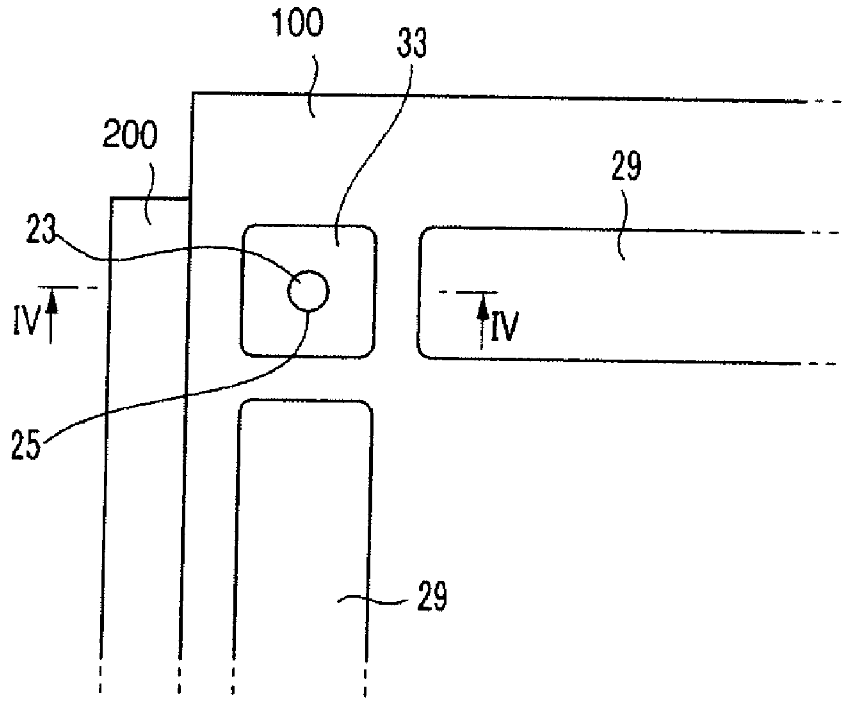
FIG. 3 is a partially enlarged front view of the periphery of an exhaust port and an exhaust tube of the plasma display panel.
Figure 4:
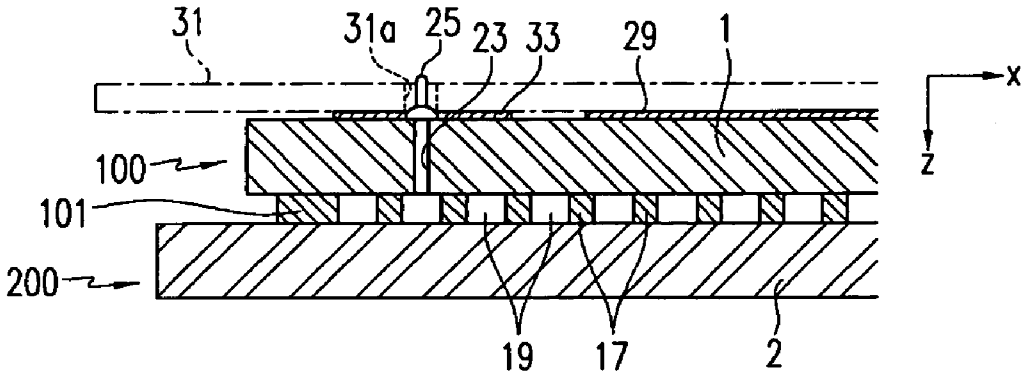
FIG. 4 is a cross-sectional view taken along the line IV-IV of FIG. 3.

During the manufacture of the plasma display panel, air remains in the discharge cells 19 formed between the front substrate 2 and the rear substrate 1 that are sealed to each other. This air is evacuated from inside of the discharge cells 19, then the discharge gas is filled therein and finally the filling path is sealed. As shown in FIGS. 3 and 4, the PDP has an exhaust port 23 on one side of the rear plate 100, more specifically on one side of the rear substrate 1, and an exhaust tube 25 formed around the exhaust port 23.

The peripheries of the front substrate 2 and the rear substrate 1 are sealed to one another by a glass frit 101 and the exhaust port 23 serves as a passage for connecting a discharge space, that is, the discharge cells 19 formed between the front substrate 2 and the rear substrate 1, to the outside. The exhaust tube 25 is connected to a portion of the exhaust port 23 that is positioned on the surface of the rear substrate 1 facing the chassis base 31 and protrudes outwardly. When evacuating air and injecting the gas, the inside of the plasma display panel communicates with the outside through the exhaust tube 25. After gas injection is completed, the exhaust tube 25 is sealed such that the inside and the outside of the PDP are isolated from each other. The exhaust tube 25 projects from the surface of the rear substrate 1. The exhaust tube 25 may be located in a through-hole 31*a* formed at the periphery near an edge of the chassis base 31. The rear substrate 1 and the chassis base 31 may be attached to each other because the exhaust tube 25 projects through the through-hole 31*a* to the outside.

The exhaust port 23 and the exhaust tube 25 are formed straight and in a direction (z-axis direction) of the thickness of the rear substrate 1. The exhaust port 23 and the exhaust tube 25 may have various cross-sectional shapes. In one embodiment, the sectional shapes of the exhaust port 23 and the exhaust tube 25 may be circles. By forming the exhaust port 23 with a circular shape, stress is concentrated on the exhaust port 23 that is due to external forces acting on the rear substrate 1. Using the circular shape, it is possible to effectively prevent the breakdown of the rear substrate 1. By forming the exhaust tube 25 in a circular shape, it is further possible to effectively withstand the pressure applied when gas is evacuated or injected.

When the plasma display panel is driven, the natural frequency of the plasma display panel resonates with the driving frequency. As a result, on the side of the PDP, a noise or vibration is caused by the resonance. At the time of the resonance, the space inside the exhaust port 23 and the exhaust tube 25 serves as a resonator to amplify the noise or vibration generated from the side of the plasma display panel. In order to absorb the noise or vibration, a pad 33 is provided in a portion of the rear substrate 1 around the exhaust port 23 and the exhaust tube 25.

The pad 33 may be formed in various structures or made of various materials that are capable of effectively absorbing the vibration and the noise generated inside or around the exhaust port 23 and the exhaust tube 25 when the PDP is driven. This pad 33 functions to interrupt the transmitting path of the noise rather than to eliminate the noise source from the plasma display panel. The pad 33 may be attached to the periphery of the exhaust port 23 without contacting the outer circumference of the exhaust tube 25. In another embodiment, the pad 33 may be attached to the periphery of the exhaust port 23 while directly contacting the outer circumference of the exhaust tube 25. The vibration caused by the resonance generated in the exhaust port 23 and the exhaust tube 25 can be effectively absorbed improving the absorption performance of noise and vibration for the side of the plasma display panel.

The pad 33 may be attached to only a portion of the rear substrate 1 at the periphery of the exhaust port 23 or may be interposed between opposing surfaces of the rear substrate 1 and the chassis base 31 to contact the opposing surfaces thereof, as shown in FIG. 4. As mentioned above, as the pad 33 contacts the opposing surfaces of the rear substrate 1 and the chassis base 31, some of the noise and vibration generated from the plasma display panel are absorbed by the pad 33, the remainder of the noise and vibration are transmitted to the chassis base 31. This structure improves absorption performance for noise and vibration. The pad 33 has the same thickness as that of the double-sided tape 29 so that the rear substrate 1 and the chassis base 31 are evenly bonded to each other without being loose, as seen from the side thereof.

As shown in FIG. 4, the pad 33 may be formed separately from the double-sided tape 29 that attaches the rear substrate 1 of the PDP to the chassis base 31. In the case that the double-sided tape 29 merely attaches the rear substrate 1 of the plasma display panel to the chassis base 31, the pad 33 which is capable of absorbing the vibration or the noise can be made of a different material from the double-sided tape 29 regardless of the material or structure of the double-sided tape 29. Therefore, the flexibility of the design is further improved.

Figure 5:
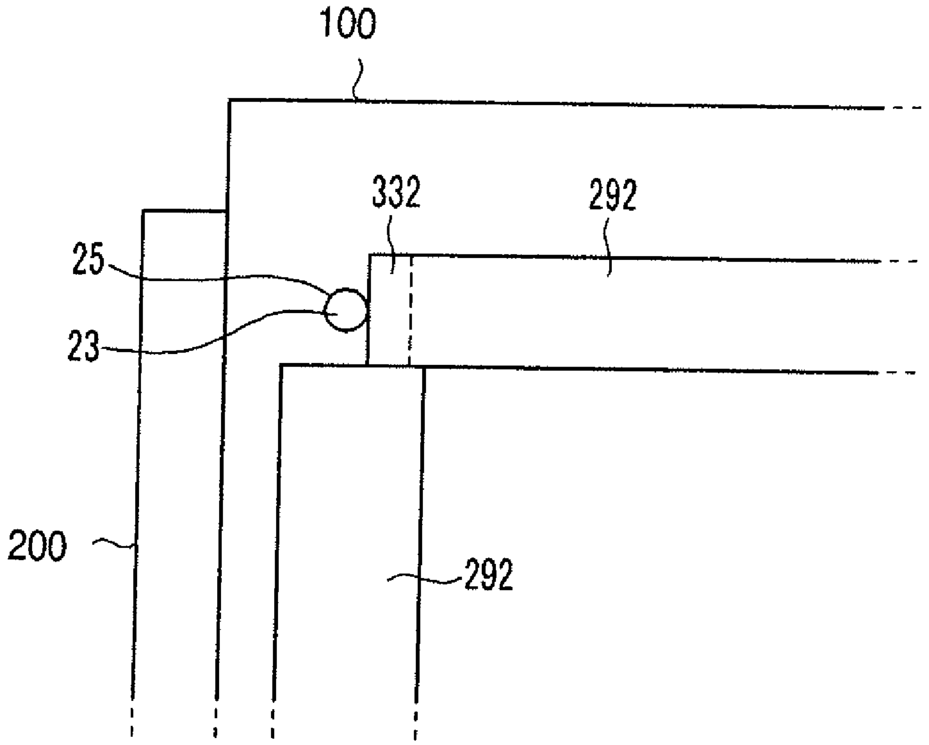
FIG. 5 is a partially enlarged front view of the periphery of an exhaust port and an exhaust tube.

Moreover, as shown in FIG. 5, a pad 332 may be formed as an extension of a double-sided tape 292 that attaches the rear substrate 1 and the chassis base 31. In this embodiment, the pad 332 is integrally formed with the double-sided tape 292. When using the integrated structure mentioned above, because the pad 332 is not formed separately from the double-sided adhesive tape 292, it is possible to reduce the number of processes required to form the pad 332. In this embodiment, the extension may be removable from the exhaust tube 25 or the extension may contact the outer circumference of the exhaust tube 25 in order to absorb the noise and vibration.

The pads 33 and 332 may be made of silicon, which has excellent properties for absorbing the noise and vibration. The pads 33 and 332 may be formed separately from or integrally with the double-sided adhesive tapes 29 and 292 and may be made of a simple adhesive tape or a foam adhesive tape having a plurality of pores.

As mentioned above, according to one embodiment, an exhaust port is provided along the edge of the one side of the rear plate and an exhaust tube is connected to the exhaust port. In addition, a pad or an adhesive tape is provided around the exhaust port and the exhaust tube. In this way, the noise and vibration around the exhaust port and the exhaust tube can be absorbed and a path through which the noise is transmitted from the exhaust port and the exhaust tube to the entire plasma display panel can be effectively blocked. In one embodiment, by forming the pad with silicon or a foam adhesive tape, it is possible to effectively absorb the noise and vibration around the exhaust port and the exhaust tube.

Although various embodiments of the present invention have been shown and described, it should be appreciated by those skilled in the art that changes may be made to the disclosed embodiments without departing from the principles and spirit of the invention, the scope of which is defined by the claims and their equivalents.

What is claimed is:

1. A plasma display panel comprising:

a first plate and a second plate sealed to each other to form discharge cells, the discharge cells configured to generate images by gas discharge;

an exhaust port in a vicinity of an edge of the first plate and connected to the discharge cells;

an exhaust tube on an outside of the first plate, the exhaust tube being connected to the discharge cells through the exhaust port in the first plate; and a non-rigid pad on the first plate adjacent the exhaust tube for absorbing noise or vibration generated around the exhaust port and the exhaust tube, wherein the non-rigid pad contacts an outer circumference of the exhaust tube.

2. The plasma display panel according to claim 1, wherein the non-rigid pad is silicon.

3. The plasma display panel according to claim 1, wherein the non-rigid pad is an adhesive tape.

4. The plasma display panel according to claim 3, wherein the non-rigid pad is a foam adhesive tape.

5. A plasma display device comprising:

a first plate and a second plate sealed to each other to form discharge cells, the discharge cells configured to generate images by gas discharge;

an exhaust port in a vicinity of an edge of the first plate and connected to the discharge cells;

an exhaust tube on an outside of the first plate, the exhaust tube being connected to the discharge cells through the exhaust port in the first plate;

a chassis base attached to the first plate by a double-sided tape; and a non-rigid pad on the first plate adjacent the exhaust tube for absorbing noise or vibration generated around the exhaust port and the exhaust tube, wherein the non-rigid pad contacts opposing surfaces of the first plate and the chassis base and an outer circumference of the exhaust tube.

6. The plasma display device according to claim 5, wherein the non-rigid pad is separate from the double-sided tape.

7. The plasma display device according to claim 6, wherein the non-rigid pad is a foam adhesive tape attachable to opposing surfaces of the first plate and the chassis base.

8. The plasma display device according to claim 5, wherein the non-rigid pad extends from the double-sided tape.

9. A plasma display panel driven at a driving frequency comprising:

a first plate and a second plate sealed to each other to form discharge cells, the discharge cells configured to generate images by gas discharge;

an exhaust port in a vicinity of an edge of the first plate and connected to the discharge cells;

an exhaust tube on an outside of the first plate, the exhaust tube being connected to the discharge cells through the exhaust port in the first plate; and a pad on the first plate in contact with an outer circumference of the exhaust tube, the pad being capable of absorbing noise or vibration generated around the exhaust port and the exhaust tube due to a natural frequency of the plasma display panel resonating with the driving frequency.

* * * * *